United States Patent [19]

Ishikawa et al.

[11] Patent Number: 4,786,715
[45] Date of Patent: Nov. 22, 1988

[54] ELECTROCHROMIC POLYMER COMPRISING N,N'-DIPHENYL-N,N'-DIPHENYLENE-PHENYLENE DIAMINE UNITS

[75] Inventors: Masazumi Ishikawa, Yokosuka; Yasuhiko Ohsawa, Tokyo; Mikio Kawai; Takao Kase, both of Yokohama; Teruko Yoshimoto, Fujisawa, all of Japan

[73] Assignee: Nissan Motor Co., Ltd., Yokohama, Japan

[21] Appl. No.: 54,872

[22] Filed: May 27, 1987

[30] Foreign Application Priority Data

May 28, 1986 [JP] Japan ................................. 61-122879

[51] Int. Cl.$^4$ ...................... C08G 73/00; C08G 73/02
[52] U.S. Cl. .................................. 528/422; 252/500; 528/210
[58] Field of Search ................. 528/422, 210; 252/500

[56] References Cited

U.S. PATENT DOCUMENTS 4,565,860 1/1986 Murofushi et al. ................. 528/422

FOREIGN PATENT DOCUMENTS 1266434 11/1986 Japan ................................. 528/422

Primary Examiner—Harold D. Anderson
Attorney, Agent, or Firm—Foley & Lardner, Schwartz, Jeffery, Schwaab, Mack, Blumenthal & Evans

[57] ABSTRACT

The disclosure relates to a novel polymer which is made up of repeating units of N,N,N'N'-tetrapheny-p-phenylenediamine. This polymer is thermoplastic and is soluble in industrially usable organic solvents. The polymer acquires high conductivity by doping with an electron acceptor. The polymer becomes insoluble in organic solvents when it is once doped with an electron acceptor and then dedoped, so that the polymer can be used as an active electrode material in electrolytic devices using an organic solvent. The polymer has electrochromic properties and undergoes two-stage oxidation and two-stage reduction to assume three differently stable states. The polymer exhibits pale yellow color in its reduced state, green color in the first-stage oxidized state and dark blue color in the second-stage oxidized state.

11 Claims, 10 Drawing Sheets

MOLECULAR WEIGHT

POTENTIAL DIFFERENCE (V)
(POLYMER ELECTRODE vs WO$_3$ ELECTRODE)

ELECTROCHROMIC POLYMER COMPRISING N,N'-DIPHENYL-N,N'-DIPHENYLENE-PHENYLENE DIAMINE UNITS

BACKGROUND OF THE INVENTION

This invention relates to a novel polymer made up of repeating units of N,N,N',N'-tetraphenyl-p-phenylenediamine, which possesses electrochromic characteristics and acquires high electroconductivity by doping with an electron acceptor.

It is known that polythiophene and polypyrrole doped with an electron acceptor exhibit high electroconductivity of the order of $10^{-3}$ to $10^{-2}$ S/cm. As conductive resins these polymers will have applications to, for example, electromagnetic wave shields. Also it is known that both polythiophene and polypyrrole are electrochemically oxidizable and reducible, so that polymer coated electrodes produced by coating an electrode substrate with either of these polymers can be used in electrolytic cells. Furthermore, both polythiophene and polypyrrole change their color as they are oxidized and reduced. Use of these polymers as electrochromic materials in electrochromic display devices has been proposed.

Both polythiophene and polypyrrole can be formed by electrolytic polymerization. This is favorable for using these polymers in electrochromic devices. However, the obtained polymers are poor in formability or processability since they are insoluble in ordinary organic solvents and are not meltable. This is a matter of serious inconvenience for practical use of these polymers, particularly as conductive resins.

As to electrochromic characteristics, polythiophene assumes a blue color in its oxidized state and a red color in reduced state, whereas polypyrrole assumes a bluish purple color in its oxidized state and a yellow color in reduced state. That is, either of these electrochromic polymers undergoes single-stage oxidation and reduction and exhibits a change between two distinct colors. It is conceivable to utilize an intermediate color by keeping such an electrochromic polymer in an incompletely oxidized or reduced state with application of a fixed voltage at a medium level, but in practice it is difficult to accurately reproduce such an intermediate color unless the potential at the electrochromic electrode is controlled extremely precisely In general, electrochromic display devices have two electrode layers which are in an opposite arrangement, at least one of which is transparent, and a film of an electrochromic material is laid on at least one electrode layer and is exposed to an electrolyte. One type of transmissive electrochromic display device uses a combination of two kinds of electrochromic materials one of which takes on a characteristic color in its oxidized state while the other takes on color in its reduced state. That is, the two electrodes are coated with two kinds of electrochromic materials, such as WO$_3$ and Prussian blue, respectively. In operation of the display device, electrochemical oxidation of, for example, Prussian blue on one electrode is accompanied by reduction of, for example, WO$_3$ on the opposite electrode. However, the WO$_3$ film as formed and the Prussian blue film as formed are both in the electrochemically oxidized state. Therefore, it is necessary to accomplish electrochemical reduction of one of the two electrochromic films precedent to actual operation of the display device by using a third or auxiliary electrode which is disposed in a marginal region of the cell of the display device. For disposition of the auxiliary electrode a considerable space is needed additional to the display area. Besides, it often becomes necessary to widen the distance between the two electrochromic electrodes with consideration of the resistance of the electrolyte solution between the auxiliary electrode and the electrochromic electrodes. In the case of a large-sized display device, widening of the distance raises another problem that uniformity of the distance over the whole display area is not easily maintained. Therefore, the thickness of the glass substrates of the electrochromic electrodes needs to be increased despite undesirable increase in size and weight of the display device, and/or relatively large-sized spacers need to be disposed between the opposite electrodes despite obstructiveness of such spacers to the sight. To obviate such inconveniences, use of polythiophene or polytriphenylamine as an alternative electrochromic electrode material has been tried. However, polythiophene is inferior in formability as mentioned above, and polytriphenylamine is unsatisfactory in endurance to repeated oxidation and reduction.

In another type of transmissive electrochromic display devices, the two electrode layers in opposite arrangement are both coated with an electrochromic material which undergoes two-stage oxidation and two-stage reduction and can assume three differently stable states, viz. reduced state, first-stage oxidized state and second-stage oxidized state, exhibiting three different colors in the respective states. Prussian blue is a typical example of such electrochromic materials. In this type of display devices the first-stage oxidation and reduction reactions of, for example, Prussian blue are utilized in one electrode and the second-stage oxidation and reduction reactions in the opposite electrode.

To fully utilize the two-stage reactions of Prussian blue it is necessary to use an electrolyte solution containing a small and precisely controlled amount of water. If the amount of water is too large, endurance of Prussian blue to repeated oxidation and reduction is marred. However, in industrial manufacturing very strict control of the content of water is very troublesome.

In reflective type electrochromic display devices, the electrochromic material on the display electrode may have either a single absorption peak as in the case of Prussian blue, WO$_3$ or Ni(OH)$_x$ or at least two absorption peaks as in the case of phthalocyanine complex or polytriphenylamine. WO$_3$ assumes a blue color in reduced state and becomes colorless in oxidized state. Prussian blue is colorless in reduced state and assumes a blue color in oxidized state. Ni(OH)$_x$ is colorless in reduced state and assumes a gray color in oxidized state. Polytriphenylamine is colorless in reduced state and assumes a brown color in an intermediately oxidized state and a dark blue color in a further oxidized state. Ruthenium diphthalocyanine assumes a blue color in reduced state, a green color in an intermediately oxidized state and an orange color in further oxidized state. That is, a multicolor disply is possible by using a suitable electrochromic material. This is an advantage of electrochromic display devices over other kinds of display devices using liquid crystals or light emitting diodes. However, problems are involved in electrochromic materials useful in reflective and multicolor display devices. For example, polytriphenylamine is unsatisfactory in endurance to repeated oxidation and reduction:

it is difficult to stably drive each display device more than 10[4] times. In the case of a phthalocyanine complex, multiple colors are exhibited in the course of single-stage oxidation and reduction. Therefore, the driving circuit becomes complicated and costly in order to utilize the color exhibited at an intermediate potential with good reproducibility.

SUMMARY OF THE INVENTION

It is an object of the present invention to provide a novel polymer which is useful as an electrochromic material having advantages over known electrochromic polymers.

The present invention provides an electrochromic polymer which is made up of repeating units represented by the general formula (I):

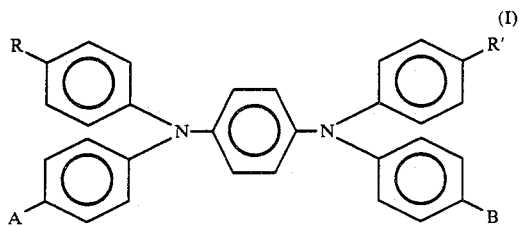

(I)

wherein R and R' each represent a hydrogen atom, an alkyl group having not more than 4 carbon atoms, and A and B indicate positions at which the repeating units bond to each other.

In other words, a polymer of the invention is made up of repeating structural units of N,N,N',N'-tetraphenyl-p-phenylenediamine.

It should be understood that the following general formula (I') represents the same structural units as the above general formula (I).

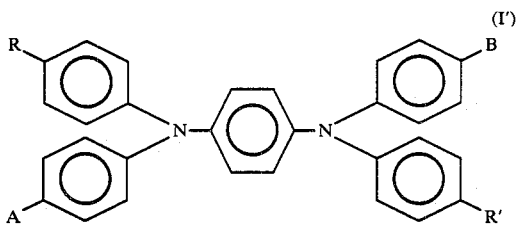

(I')

A polymer of the invention is a thermoplastic material and, therefore, can be molded or otherwise processed by using various methods thus far developed for shaping conventional thermoplastic polymers. Furthermore, this polymer is soluble in several kinds of industrially usable organic solvents such as, for example, benzene, chloroform and tetrahydrofuran. Therefore, a film of the polymer can easily be formed by a cast coating method, dip coating method, spin coatin9 method or the like.

It is easy to afford high conductivity to a polymer according to the invention by doping with an electron acceptor such as, for example, iodine, arsenic pentafluoride, aluminum chloride or ferric chloride, and the conductivity of the doped polymer is stable even though the polymer is exposed to the air. Also it is possible to apply a adequately doped polymer of the invention to semiconductor devices to utilize semiconductive characteristics of the doped polymer.

It is very interesing that a polymer of the invention becomes insoluble in most organic solvents when the polymer is once doped with an electron acceptor and then dedoped. This property of the polymer can advantageously be utilized for producing a polymer coated electrode for use in an electrolyte liquid using an organic solvent by the steps of dissolving the polymer in a suitable organic solvent, applying the solution to an electrode body or substrate by a cast coating method, spin coating method or dip coating method to thereby form a coating film of the polymer, doping the polymer film with, for example, iodine and then dedoping the once doped polymer film.

In the resulting polymer coated electrode, which is used in an electrolyte liquid, the insolubilized polymer film undergoes two-stage oxidation and two-stage reduction and can assume three differently stable states, viz. a reduced state, first-stage oxidized state and second-stage oxidized state, and the polymer film is very stable and endures to repeated oxidation and reduction. That is, the polymer is practicable as an active electrode material having two-stage reaction potentials. Furthermore, the polymer exhibits three different types of absorption spectra (for ultraviolet and visible wavelengths) inherent in the aforementioned three stable states, respectively. That is, the polymer assumes three different colors in its reduced, first-stage oxidized and second-stage oxidized states, respectively. Accordingly this polymer is of use as an electrochromic material.

For example, when an electrode having a polymer coating film according to the invention is tested as a working electrode in an electrolytic solution of 1 mol/-liter of lithium perchlorate in propylene carbonate by using platinum as the counter electrode and Ag/AgCl as a reference electrode, the polymer film exhibits the following changes according to the level of potential at the working electrode (vs reference electrode, Ag-/AgCl). In the potential range of 0–0.4 V the polymer is stably in a reduced state and assumes a very pale yellow color. In the potential range of 0.8–0.9 V the polymer is stably in a first-stage oxidized state and assumes a green color. The polymer undergoes further oxidation, and in the potential range of 1.2–1.4 V it is stably in a second-stage oxidized state and assumes a deep and dark blue color. There is little change in color tone within each of these three potential ranges, so that practically the same color tone can be reproduced by controlling the working electrode potential with accuracy of about 0.1 V. Therefore, when this polymer is used in an electrochromic device the electric circuit for driving the device can be simplified and reduced in cost. Also it is possible to have the polymer on the working electrode exhibit an intermediate color by maintaining a potential intermediate between the aforementioned three ranges. Furthermore, the degree of lightness or deepness of the colors of the polymer film on the electrode can be controlled by controlling the thickness of the polymer film. For example, the above described changes from yellow to green and then to deep and dark blue, and vice versa, are observed when the polymer film has a thickness of about 6000 Å. When the film thickness of the same polymer is about 1000 Å, the polymer film seems almost colorless in its reduced state and assumes a yellowish green color in the first-stage oxidized state and dark blue color in the second- stage oxidized state.

The above described color changing properties of a polymer of the invention can be utilized in various types of electrochromic display devices. The polymer may be applied to both electrodes of a transmissive type display device to use the first-stage reaction in one electrode and the second stage reaction in the opposite electrode. Also it is possible to use this polymer in combination with another electrochromic material which is formed in its oxidized state since the polymer of the invention can be formed in its reduced state. Besides, multicolor display is practicable by using this polymer in a reflective type electrochromic display deivice.

DESCRIPTION OF THE PREFERRED EMBODIMENTS

Figure 1:
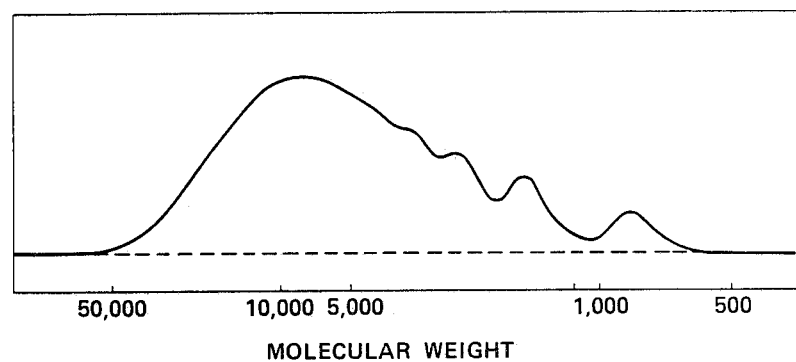
FIG. 1 is a chart showing molecular weight distribution of a polymer obtained in Example 1 of the invention.

A polymer according to the invention is prepared by a two-stage reaction represented by the following equation (1), wherein R and R' are as defined hereinbefore and X represents a halogen atom. That is, the polymer is obtained by a polymerization reaction in which a Grignard reagent is formed as an intermediate. Reactions of this type are known as polymerization reactions producing intermolecular bonds at the positions of substitution of the halogen atom. The reaction is carried out in an unreactive solvent by using a catalyst, which is usually a nickel compound or a palladium compound.

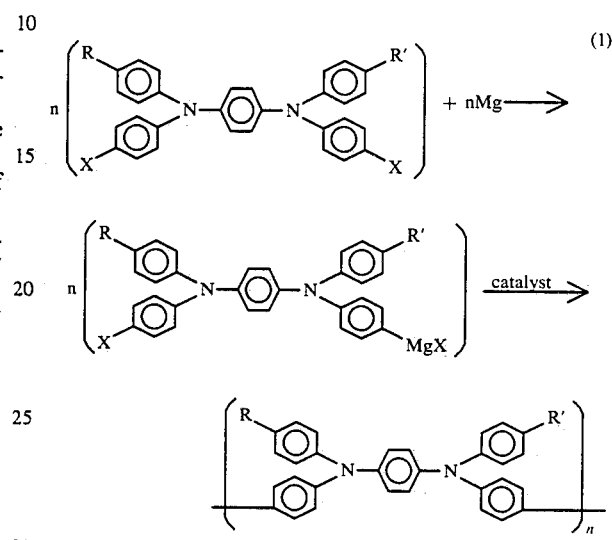

The halogenated monomer as the starting material can be prepared by a process represented by tho following equation (2).

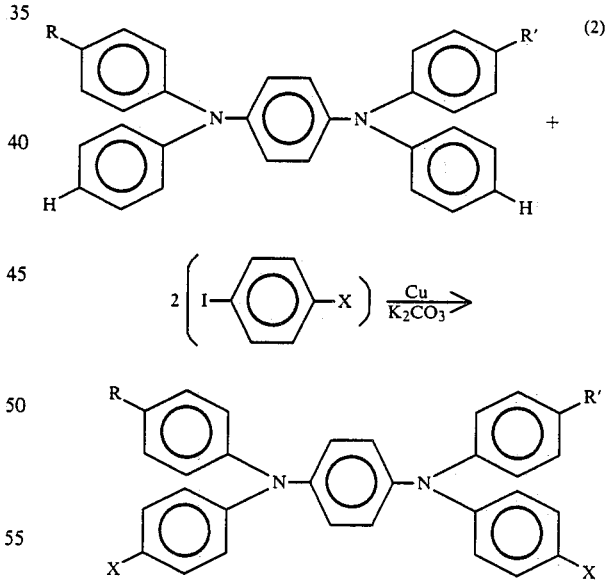

Metallic magnesium in active state for use in the Grignard reaction can be obtained by the well known reaction represented by equation (3), which is carried out in an unreactive solvent.

$$2K + MgCl_2 \rightarrow Mg + 2KCl \quad (3)$$

Typical examples of the unreactive solvent for use in the reaction (1), and also in the reaction (3), are ethyl ether, tetrahydrofuran and dibutyl ether. Typical examples of the catalyst for use in the reaction (1) are nickel dichloride, nickel dibromide, dichloro(2,2-bipyridine)-nickel and dichloro(2,2-bipyridine)palladium.

A polymer according to the invention can be used as an electrochromic material. As to the electrolyte liquid to be used in combination with an electrochromic material according to the invention, very wide selection can be made from solutions of a supporting electrolyte such as, for example, $LiClO_4$, $LiBF_4$, $LiPF_6$, $KBF_4$, $KPF_6$, $N(CH_3)_4ClO_4$, $N(CH_3)_4BF_4$, $N(C_2H_5)_4ClO_4$ or $N(C_2H_5)_4BF_4$ in water or an organic solvent such as, for example, propylene carbonate, acetonitrile or N,N-dimethylformamide, or a mixed solvent.

In producing an electrochromic electrode by using a polymer according to the invention, a film of the polymer is formed on a conductive surface or substrate such as, for example, a transparent coating film formed of $SnO_2$ or $In_2O_3$, or a sheet, meshwork or a deposition film of a suitable metal such as Pt, Au or Ti.

The invention is further illustrated by the following nonlimitative examples.

EXAMPLE 1

1. Preparation of Monomer

In a flask a mixture of 26.0 g (0.1 mol) of N,N'-diphenyl-p-phenylenediamine, 47.6 g (0.2 mol) of p-iodochlorobenzene, 27.6 g (0.2 mol) of potassium carbonate, 5 ml of nitrobenzene and 1 g of copper powder was heated under reflux for 24 hr. After the reaction nitrobenzene was removed by steam distillation, and recrystallization with benzene was carried out to obtain 19 g of N,N'-bis (p-chlorophenyl) N,N'-diphenyl-p-phenylenediamine of the following formula. The yield was 39%. The melting point of the resulting compound was 204°–206° C.

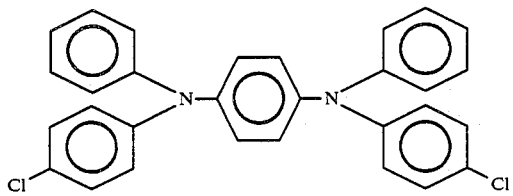

2. Preparation of Polymer

Using a 100 ml flask, 0.88 g (0.022 gram atom) of metallic potassium and 1.05 g (0.011 mol) of magnesium chloride were reacted in 50 ml of tetrahydrofuran by heating under reflux in a nitrogen gas atmosphere. In about 1 hr the reaction gave metallic magnesium in the form of black powder. Then 4.53 g (0.01 mol) of N,N'-bis(p-chlorophenyl)-N,N'-N'-diphenyl -p-phenylenediamine was added, and heating at reflux temperature was continued for about 2 hr to thereby form a Grignard reagent.

Next, 0.01 g (0.03 millimol) of dichloro-bis(2,2'-bipyridine)nickel was added as a polymerization catalyst to the mixture in the flask, and heating under reflux was resumed. A polymerization reaction took place and proceeded smoothly. The reaction was carried out for 3 hr. and than the mixture in the flask was poured into ethanol to precipitate a crude polymer in the form of a yellowish white powder. The crude polymer was washed first with a dilute hydrochloric acid and then with ethanol to thereby remove most of impurities. The washed polymer was dissolved in chloroform to obtain a solution, which was slightly and whitely muddy. By filtration the solution turned into a uniformly clear liquid, and the separated white mud was confirmed to be of inorganic matter. After that the solvent was evaporated, and the precipitated polymer was dried. The dry weight of the polymer was 3.8 g.

The polymer obtained by the above process assumed a yellowish white color and had a softening temperature of approximately 200° C. This polymer was freely soluble in chloroform, benzene, toluene and tetrahydrofuran, slightly soluble in hot ethanol and hot acetone and insoluble in water, ethanol and methanol. Elementary analysis of this polymer gave the following result.

Calculated as $(C_{24}H_{22}N_2)_n$: C 87%, H 5.36%, N 6.82%

Found: C 84.6%, H 5.30%, N 6.58%, Cl 3.2%

Thus, the measurements were very close to the theoretical values. Chlorine in the obtained polymer was presumed to be at unreacted terminals of some molecules of the monomer.

FIG. 1 shows molecular weight distribution of the resulting polymer measured by a gel permeation chromatography method. The solvent was chloroform, and the detector was of the type measuring ultraviolet absorbance. The molecular weights were calculated as polystyrene. By calculation from the data obtained, weight average molecular weight of the polymer was 8300 and number average molecular weight was 2700.

Figure 2:
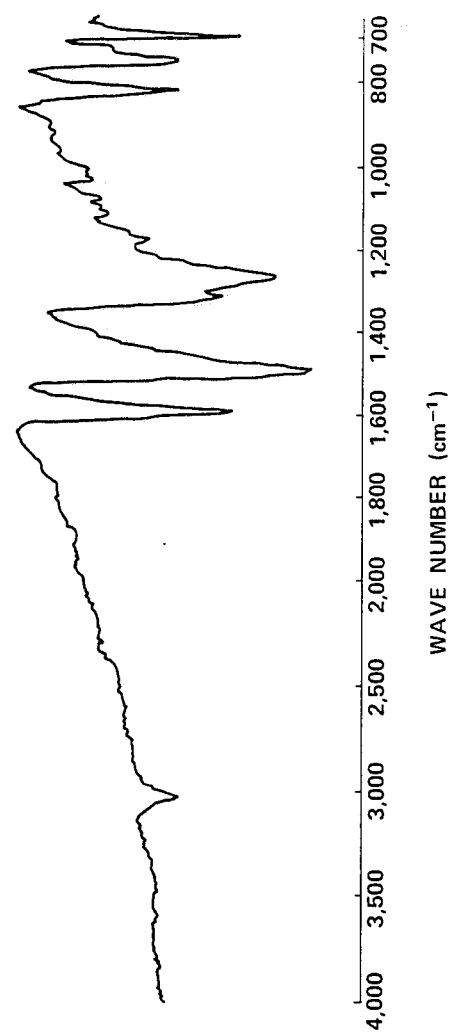
FIG. 2 shows the infrared absorption spectrum of the polymer obtained in Example 1.
Figure 3:
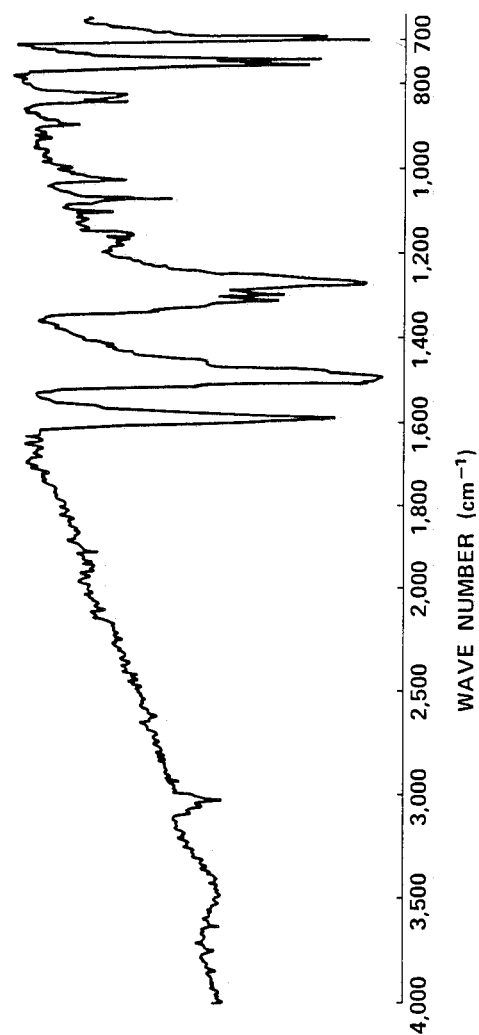
FIG. 3 shows the infrared absorption spectrum of N,N,N',N'-tetraphenyl-p-phenylenediamine.

FIG. 2 shows the infrared absorption spectrum of the same polymer, and FIG. 3 shows the infrared absorption spectrum of N,N,N',N'-tetraphenyl-p-phenylenediamine. There are good conincidences between FIG. 2 and FIG. 3 at 1590 $cm^{-1}$, 1490 $cm^{-1}$, 1310 $cm^{-1}$ and 1260 $cm^{-1}$, while an increase in absorption at 820 $cm^{-1}$ (para-substituted benzene) is appreciable in FIG. 2. These data indicate that the polymer subjected to analysis comprised repeating units of N,N,N',N'-tetraphenyl-p-phenylenediamine.

EXAMPLE 2

The polymer prepared in Example 1 was dissolved in chloroform, and the solution was applied onto a glass substrate by a spin coating method to form a polymer film having a thickness of 3000 Å. The film was doped with iodine by exposing the film to saturated vapor of iodine at room temperature for 15 hr. The conductivity of the iodine doped film measured by the two-probe method was as high as 0.05 S/cm. The same conductivity was obtained also when doping of the same polymer film was carried out by exposure to saturated iodine vapor in the presence of air.

EXAMPLE 3

Figure 4:
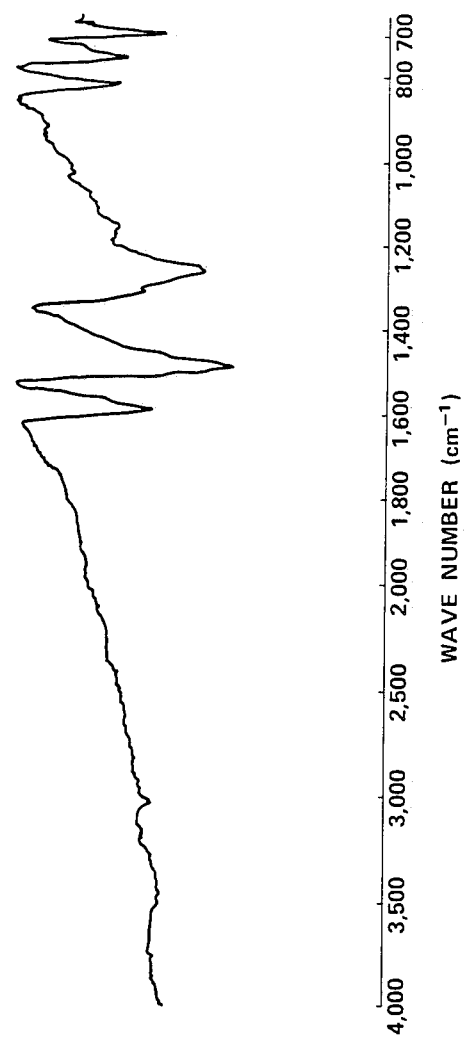
FIG. 4 shows the infrared absorption spectrum of a polymer prepared in Example 1 and insolubilized by doping and dedoping treatments.

The polymer of Example 1 was formed into a film having a thickness of 1000 Å by the same method as in Example 2. The polymer film was doped with iodine by exposing it to saturated vapor of iodine at 100° C., and then the film was dedoped in high vacuum. Samples of the dedoped polymer film were immersed in various solvents such as chloroform, benzene, toluene, tetrahydrofuran and chlorobenzene, but dissolution did not occur in any case. FIG. 4 shows the infrared absorption spectrum of the polymer film rendered insoluble by dedoping. Comparing FIG. 4 with FIG. 2, a slight increase in the absorption attributed to p-substituted benzene is perceptible. Therefore, it is presumable that some cross-linking took place at the p-position of benzene rings in the polymer.

EXAMPLE 4

The polymer of Example 1 was dissolved in chloroform, and the solution was spun onto a transparent conductive film coated on a glass substrate so as to form a polymer film having a thickness of 1100 Å. The polymer film was doped with iodine by exposing the film to saturated vapor of iodine at 100° C. for 2 hr, and then the film was dedoped in high vacuum.

In this example the dedoped polymer film was used as an electrochromic film. Two electrochromic electrode plates of the same size and same coating thickness were cut out of the glass substrate coated with the transparent conductive film and the polymer film. The manner of electrochemical oxidation and reduction of the electrochromic electrode plates was tested in an electrolyte solution, which was 1 mol/liter solution of $LiClO_4$ in propylene carbonate, by using a platinum electrode as the counter electrode and Ag/AgCl electrode as a reference electrode. The potential at each electrochromic electrode plate was varied at a constant sweep rate of 10 mV/sec. The test on the two electrochromic electrode plates gave the same cyclic voltammogram which is shown in FIG. 5.

Figure 5:
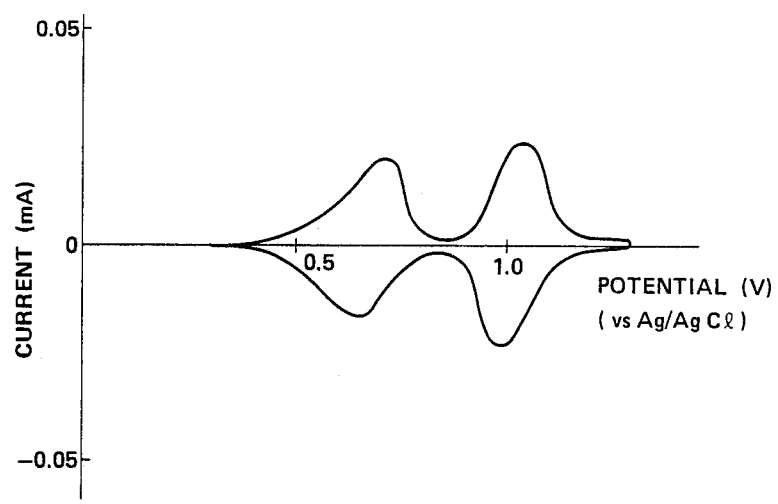
FIG. 5 is a cyclic voltammogram obtained by testing the polymer mentioned with respect to FIG. 4 as an electrochromic material.

FIG. 5 indicates that the polymer film on the tested electrode plates undergo two-stage oxidation and two-stage reduction. In the potential range 0–0.4 V (vs Ag/AgCl) the polymer film was in a reduced state and was almost colorless. In the potential range of 0.8–0.9 V (vs Ag/AgCl) the polymer film remained in the first-stage oxidized state and assumed a yellowish green color. In the potential range of 1.2–1.4 V (vs Ag/AgCl) the polymer film remained in the second-stage oxidized state and assumed a dark blue color. There was little change in color tone within each of these three potential ranges, and intermediate colors were exhibited at intervening potentials. The quantity of electricity at oxidation or reduction was about 1.89 $mC/cm^2$ in the first-stage reaction which took place over the potential range of 0.3–0.75 V and, nearly equivalently, about 1.91 mC/cm2 in the second-stage reaction over the potential range of 0.75–1.3 V.

Figure 6:
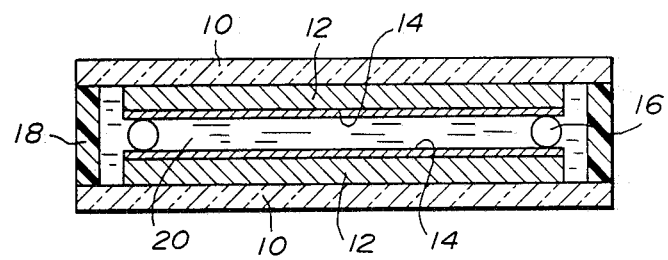
FIG. 6 is a schematic and sectional illustration of a transmissive type electrochromic display device produced in an example of the invention.

The electrolytic driving test was terminated when the potential at the electrochromic electrode was 0.85 V (vs Ag/AgCl) to thereby keep the polymer film in the first-stage oxidized state. In a nitrogen gas atmosphere both of the two electrochromic electrode plates in that state were taken out of the electrolyte solution, and an electrochromic display device shown in FIG. 6 was produced by using these two electrode plates. As mentioned above, each of the electrochromic electrode plates was made up of a transparent glass substrate 10 having a transparent electrode film 12 deposited thereon and an electrochromic polymer film 14 coated on the conductive film 12. The two electrochromic electrode plates were arranged opposite to each other at a short distance determined by spacers 16 and were bonded to each other with a peripheral seal layer 18. The space between the two electrode plates was filled with an electrolyte liquid 20, which was 1 mol/liter solution of $LiClO_4$ in propylene carbonate. Initially this display device exhibited a yellowish green color since the electrochromic polymer films 14 on both electrodes were in the first-stage oxidized state.

Figure 7:
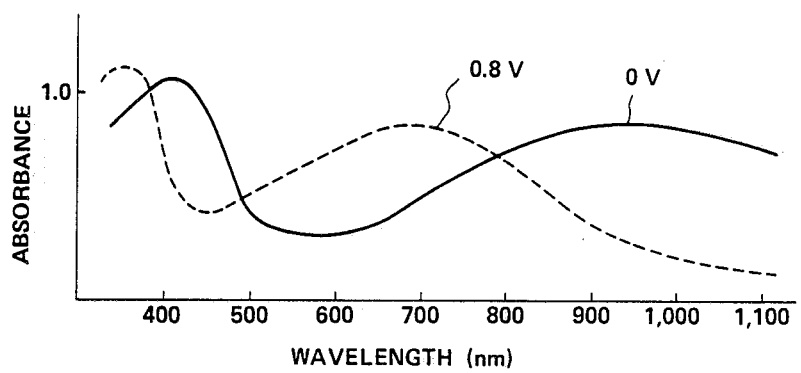
FIG. 7 is a chart showing a change in spectral absorbance of the electrochromic disply device of FIG. 6 with a change in potential difference between the two electrodes.

Then a DC voltage of 0.8 V was applied across the two electrodes of this electrochromic device. As a result the electrochromic polymer film 14 on one electrode was further oxidized to the second-stage oxidized state to assume a dark blue color, whereas the polymer film 14 on the opposite electrode was reduced to become almost colorless. Accordingly the display device exhibited a blue color irrespective of the polarity of the applied voltage. When the two electrodes were subsequently short-circuited the color of the display device reverted to the initial yellowish green color. FIG. 7 shows changes in absorption spectrum observed by thus driving the electrochromic display device. The drive of the display device with a rectangular wave for alternate switching of the voltage between the two electrodes to 0.8 V and to 0 V was repeated $10^3$ times, but there was little change in the coloring and bleaching characteristics of the display device.

EXAMPLE 5

Using the polymer of Example 1, an electrochromic electrode plate was produced in the same manner as in Example 4 except that the thickness of the polymer film was increased to about 6000 Å. In 1 mol/liter solution of $LiClO_4$ in propylene carbonate the coloring characteristics of the electrochromic electrode were examined by using platinum as the counter electrode and Ag/AgCl as a reference electrode. The polymer film on the tested electrode assumed a pale yellow color in the potential range of 0–0.4 V (vs Ag/AgCl), a green color in the potential range of 0.8–0.9 V and a dark blue color in the potential range of 1.2–1.4 V, and intermediate colors were exhibited at intervening potentials.

EXAMPLE 6

Figure 8:
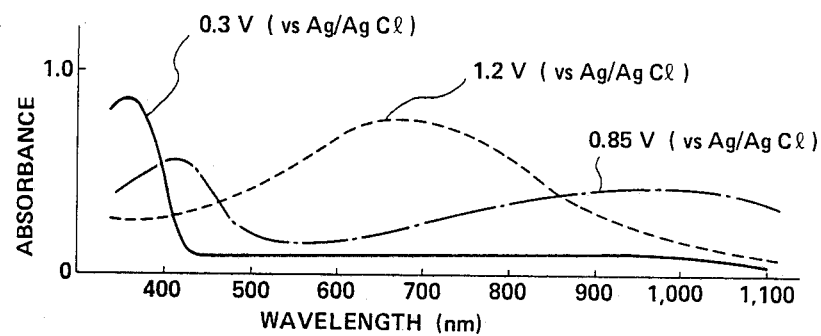
FIG. 8 is a chart showing absorption spectra of the polymer mentioned with respect to FIG. 4 measured while maintaining the polymer at three different potentials in an electrolyte solution.

Using the polymer of Example 1, an electrochromic electrode plate was produced in accordance with Example 4. The thickness of the polymer film was 1100 Å. In 1 mol/liter solution of $LiClO_4$ in propylene carbonate and using platinum as the counter electrode and Ag/AgCl as a reference electrode, absorption spectrum of the polymer film on the electrochromic electrode for ultraviolet, visible and near infrared wavelengths was measured by maintaining this electrode at a constant potential (vs Ag/AgCl), which was 0.3 V, 0.85 V or 1.2 V. FIG. 8 shows the resulting absorption spectra, which clearly indicate that the polymer film assumed a yellow color at the potential of 0.3 V (vs Ag/AgCl), a green color at 0.85 V and a dark blue color at 1.2 V. The experiment was repeated on another sample of the electrochromic electrode in which the film of the same polymer had a thickness of 6000 Å. The spectral absorption characteristics of the polymer film were generally as shown in FIG. 8.

EXAMPLE 7

Using the polymer of Example 1, an electrochromic electrode plate was produced in accordance with Example 4. The thickness of the polymer film was about 1100 Å. In 1 mol/liter solution of $LiClO_4$ in propylene carbonate and using platinum as the counter electrode, the potential of the electrochromic electrode with respect to Ag/AgCl reference electrode was maintained at 0.3 V for 3 sec and then at 1.2 V for 3 sec, and this sequence was repeated 5000 times. After that the quantity of electricity in oxidation reaction of the tested electrochromic electrode was measured to be about 95% of the initial value (measured after repeating the stepwise change in potential 10 times), and no significant difference was observed in the color tones at the respective potentials.

REFERENCE 1

Figure 9:
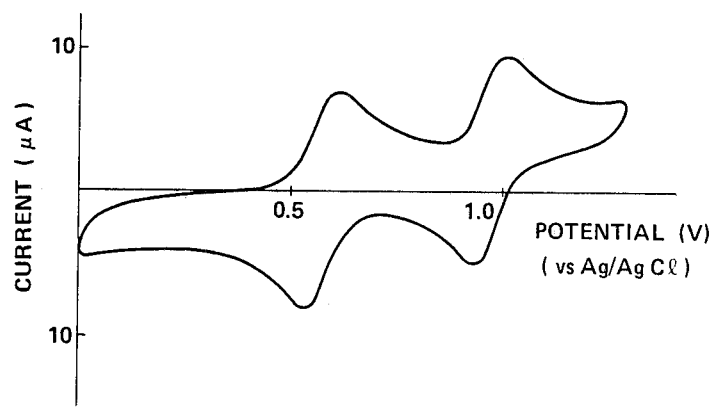
FIG. 9 is a cyclic voltammogram of N,N,N',N'-tetraphenyl-p-phenylenediamine dissolved in an electrolyte solution.

Monomer of N,N,N',N'-tetraphenyl-p-phenylenediamine was dissolved in 1 mol/liter solution of LiClO$_4$ in propylene carbonate at saturation temperature. In this electrolytic solution the manner of oxidation-reduction reaction of the dissolved monomer was examined by using platinum as the material of both the working electrode and the counter electrode and Ag/AgCl as a reference electrode. FIG. 9 shows a cyclic voltammogram obtained in this experiment. This cyclic voltammogram indicates occurrence of two-electron oxidation and reduction reactions with peaks in oxidation current at about 0.58 V (vs Ag/AgCl) and at about 1.07 V. In view of resemblance of this cyclic voltammogram to the voltammogram of the polymer, shown in FIG. 5, it is presumable that for each repeating unit of the polymer two electrons participate in the oxidation and reduction of the polymer.

EXAMPLE 8

Figure 10:
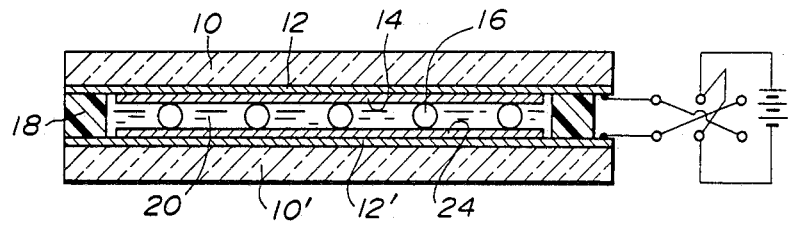
FIG. 10 is a schematic and sectional illustration of a transmissive type electrochromic display device produced in another example of the invention.
Figure 11:
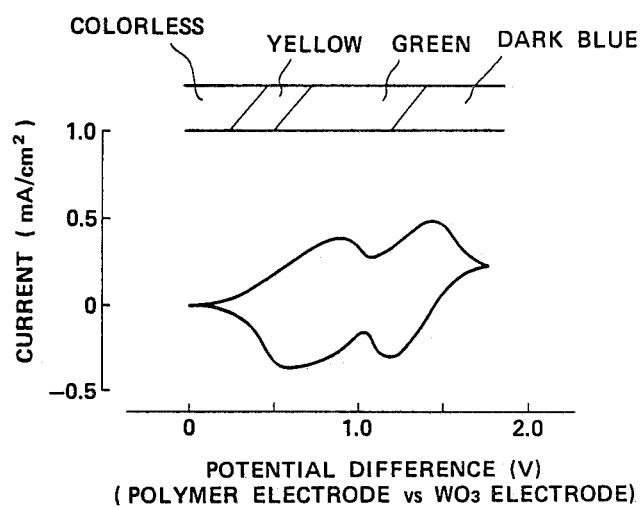
FIG. 11 is a chart showing changes in the magnitude of current in oxidation-reduction reaction in the display device of FIG. 10 and in the color the display device exhibits with a change in potential difference between the two electrodes.

FIG. 10 shows a transmissive type electrochromic display device produced in this example. A first electrochromic electrode was made up of a transparent glass substrate 10 having a transparent conductive film 12 deposited thereon and a film 14 of the electrochromic polymer of Example 1 formed by the same method as in Example 4. The polymer film 14 had a thickness of 6000 Å. A second electrochromic electrode was made up of a transparent glass substrate 10' having a transparent conductive film 12' deposited thereon and a WO$_3$ film 24 deposited on the conductive film 12' to a thickness of 6000 Å by a vacuum deposition method. Using glass spheres 16 having a diameter of 40 μm as spacer, the two electrodes were arranged opposite to each other and bonded to each other with a peripheral seal layer 18 formed of an epoxy base adhesive. The space in the resultant cell was filled with an electrolyte liquid 20, which was 1 mol/liter solution of LiClO$_4$ in propylene carbonate. The potential at the first electrode having the polymer film 14 was varied over the range from 0 to about 2 V with respect to the opposite electrode having the WO$_3$ film 24 at a sweep rate of 10 mV/sec to examine the magnitude of current in oxidation or reduction reaction. The result was as shown in FIG. 11. As can be seen, coloration of this electrochromic display device could be accomplished by applying a voltage of up to 1.8 V across the two electrodes, and bleaching could be accomplished by applying a reverse voltage of at least 0 V.

Figure 12:
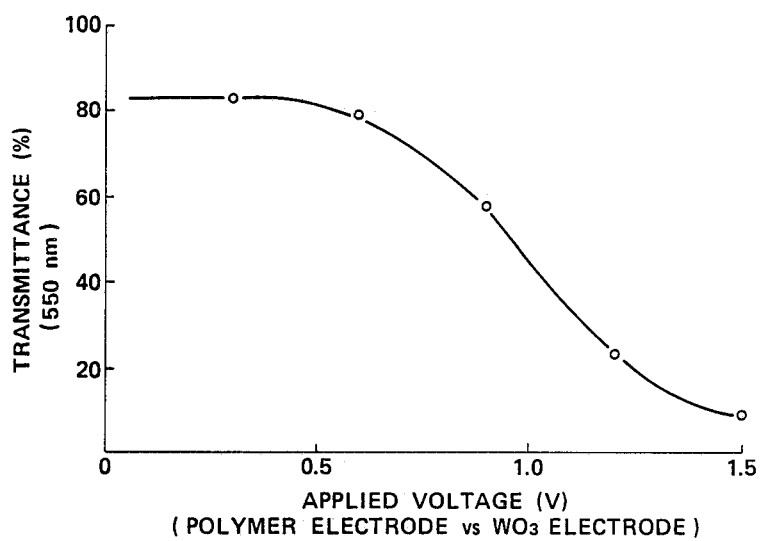
FIG. 12 is a chart showing the manner of a change in light transmittance of the electrochromic display device of FIG. 10 with a change in potential difference between the two electrodes.
Figure 13:
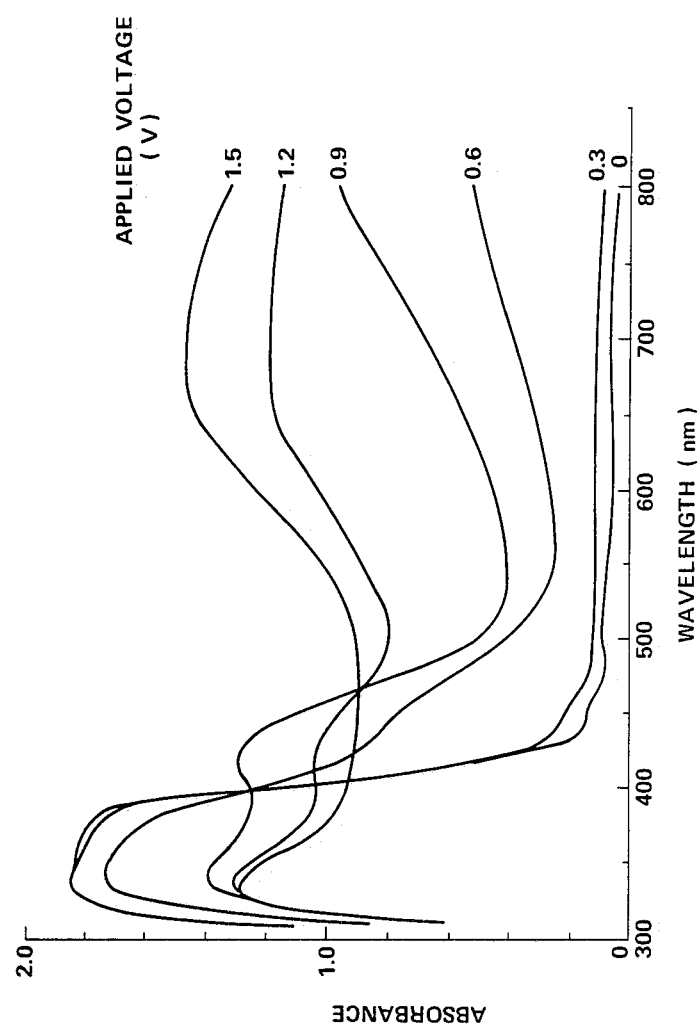
FIG. 13 is a chart showing absorption spectra of the electrochromic display device of FIG. 10 measured while operating the display device with various voltages.

FIG. 12 shows the relationship between the voltage applied across the two electrodes of this electrochromic display device and the light transmittance of the display device at a wavelength of 550 nm. It is seen that the transmittance can be regulated over a wide range from about 10% to about 80%. The light transmittance varying performance can be further improved by making the electrochromic polymer film 14 thicker than 6000 Å, which was the thickness in this example. FIG. 13 shows absorption spectra of this electrochromic display device operated with various voltages.

In the electrochromic display device produced in this example, the WO$_3$ film 24 on the second electrode can be replaced by a film of a different transition metal oxide such as MoO$_3$, Nb$_2$O$_5$, Cr$_2$O$_3$, Ta$_2$O$_5$, TiO$_2$, Fe$_2$O$_3$ or AgO.

Figure 14:
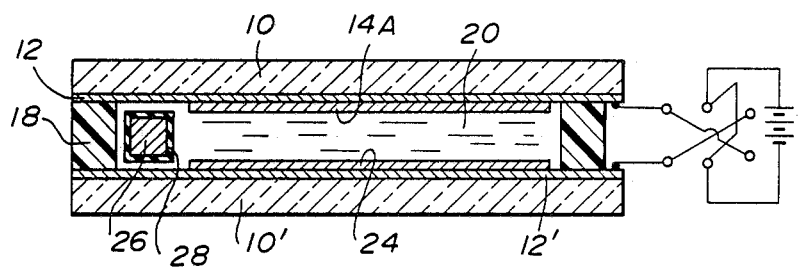
FIG. 14 is a schematic and sectional illustration of a conventional transmissive type electrochromic display device.

FIG. 14 shows a conventional transmisive type electrochromic display device using two kinds of electrochromic materials in its two oppositely arranged electrodes. For example, the electrochromic layer 14A on the first electrode is formed of Prussian blue which assumes a blue color in an electrochemically oxidized state, whereas the electrochromic layer 24 on the opposite electrode is formed of WO$_3$ which is colorless in oxidized state and takes on a blue color by reduction. Both the Prussian blue layer 14A as formed and the WO$_3$ layer 24 as formed are in oxidized state. Since simultaneous coloration of the two electrodes is intended it is necessary to accomplish electrochemical reduction of one of the two electrochromic layers 14A and 24 prior to actual operation of the display device. For use in the initial reduction treatment the device includes an auxiliary electrode 26 covered with a porous insulator 28. However, including the auxiliary electrode 26 is inconvenient when designing the display device as mentioned hereinbefore. In contrast, the electrochromic display device produced in Example 8 (FIG. 10) does not need to include such an auxiliary electrode since the electrochromic polymer film 14 as formed is in reduced state.

EXAMPLE 9

Figure 15:
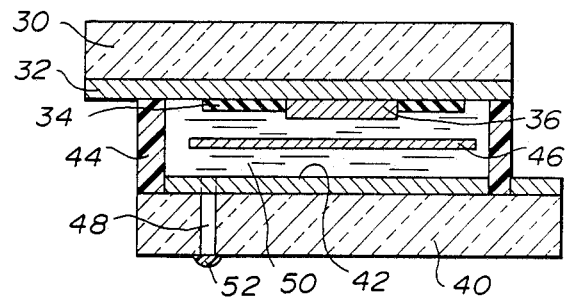
FIG. 15 is a schematic and sectional illustration of a reflective type electrochromic display device produced in another example of the invention.

FIG. 15 shows a reflective type electrochromic display device produced in this example. A transparent glass plate 30 coated with a transparent electrode film 32 was used as a front substrate. First, by a vacuum deposition method an insulating film 34 of MgF$_2$ was deposited to a thickness of 800 Å on the transparent electrode film 32 except in a display pattern area and an electrode terminal area. Next, an electrochromic display electrode 36 was formed by the steps of forming a coating film of the polymer prepared in Example 1 by application of a solution of the polymer in chloroform, doping the polymer film with iodine at 100° C. and then dedoping the polymer film in high vacuum. The thickness of the polymer film 36 of the display electrode was 2000 Å. On a glass plate 40 used as a back substrate, a counter electrode layer 42 was formed by electrodeposition of Prussian blue to a thickness of 3000 Å on a carbon fiber layer. The display electrode 36 and the counter electrode 42 were held opposite to and spaced from each other by a peripheral seal layer 44, and a porous sheet 46 of alumina was disposed between the two electrodes as a background board. As an electrolyte liquid 50, 1 mol/liter solution of LiClO$_4$ in propylene carbonate was injected into the cell by an inlet port 48 formed in the back substrate 40. After that the inlet port 48 was closed up with an epoxy sealant 52.

Figure 16:
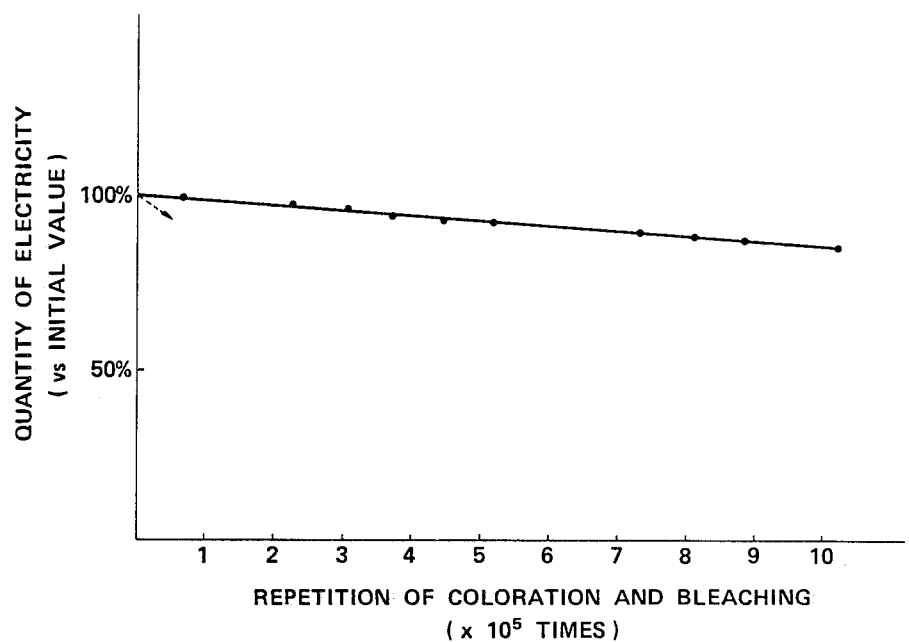
FIG. 16 is a chart showing the result of an endurance drive test on the display device of FIG. 15.

The display device was repeatedly driven by alternately applying a coloration voltage of 8 V (at the display electrode 36 vs the counter electrode 42) and a bleaching voltage of −8 V. FIG. 16 shows the manner of a change in the quantity of electricity at oxidation reaction of the display electrode from the initial value. As can be seen in this chart the function of the display device was stable even after repeating coloration and bleaching $10^5$ times, meaning that the display device was excellent in durability.

What is claimed is:

1. An electrochromic polymer comprising repeating units represented by the general formula (I):

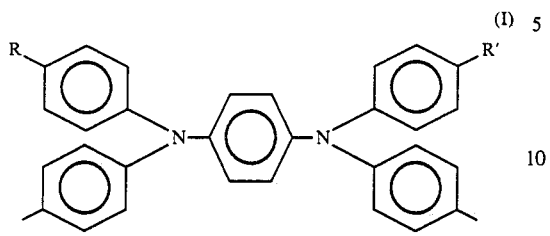 (I)

wherein R and R' each represent a hydrogen atom, an alkyl group having not more than 4 carbon atoms or an alkoxyl group having not more than 4 carbon atoms.

2. A polymer according to claim I, wherein both of said R and R' are hydrogen atoms.

3. An electroconductive polymeric material, comprising:

a polymer comprising repeating units represented by the general formula (I):

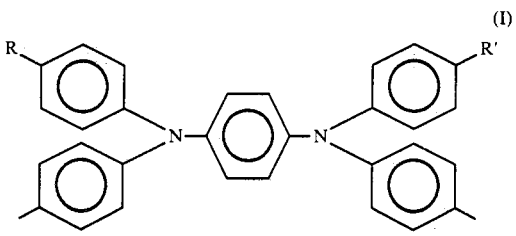 (I)

wherein R and R' each represent a hydrogen atom, an alkyl group having not more than 4 carbon atoms or an alkoxyl group having not more than 4 carbon atoms; and an electron accepting dopant.

4. A polymeric material according to claim 3, wherein both of said R and R' are hydrogen atoms.

5. A polymer according to claim 1, consisting essentially of the repeating units.

6. A polymer according to claim 5, wherein both of said R and R' are hydrogen atoms.

7. A polymer according to claim 1, consisting of the repeating units.

8. A polymeric material according to claim 3, wherein the polymer consists essentially of the repeating units.

9. A polymeric material according to claim 3, wherein the polymer consists of the repeating units.

10. A polymeric material according to claim 8, consisting essentially of the polymer and the dopant.

11. A polymer according to claim 7, wherein both of said R and R' are hydrogen atoms.

* * * * *